United States Patent [19]

Sodickson

[11] 4,386,895

[45] Jun. 7, 1983

[54] APPARATUS FOR PRODUCING CAPSULES

[75] Inventor: Lester A. Sodickson, Newton, Mass.

[73] Assignee: Damon Corporation, Needham Heights, Mass.

[21] Appl. No.: 320,881

[22] Filed: Nov. 13, 1981

[51] Int. Cl.³ ............................................. B28B 1/54
[52] U.S. Cl. ........................................ 425/5; 425/8; 264/4
[58] Field of Search .................. 425/5, 8; 264/4

[56] References Cited

U.S. PATENT DOCUMENTS

| | | | |
|---|---|---|---|
| 2,766,478 | 10/1956 | Raley, Jr. et al. | 18/1 |
| 3,015,128 | 1/1962 | Somerville, Jr. | 425/8 |
| 3,111,708 | 11/1963 | Watt | 18/2.6 |
| 3,202,731 | 8/1965 | Grevenstuk et al. | 264/7 |
| 3,266,085 | 8/1966 | Nacke | 18/2.6 |
| 3,270,100 | 8/1966 | Jolkovski et al. | 264/4 |
| 3,293,695 | 12/1966 | Baymiller et al. | 425/8 |
| 3,310,612 | 3/1967 | Sommerville, Jr. | 264/4 |
| 3,352,280 | 11/1967 | Hughes et al. | 118/9 |
| 3,358,323 | 12/1967 | Chisholm | 18/2.6 |
| 3,639,306 | 2/1972 | Sternberg et al. | 260/2.5 B |
| 3,664,963 | 5/1972 | Pasin | 252/316 |
| 3,816,331 | 6/1974 | Brown, Jr. et al. | 252/316 |
| 3,856,899 | 12/1974 | Schott | 264/8 |
| 3,877,918 | 4/1975 | Cerbo | 65/142 |
| 3,907,537 | 9/1975 | Irgens-Bergh | 65/142 |
| 4,123,206 | 10/1978 | Dannelly | 425/5 |
| 4,149,836 | 4/1979 | Price | 425/8 |
| 4,218,409 | 8/1980 | Dannelly | 264/4 |

Primary Examiner—James R. Hall
Attorney, Agent, or Firm—Lahive & Cockfield

[57] ABSTRACT

Disclosed is an apparatus for producing capsules of the type which are formed by immersing liquid droplets in a gelling agent. The apparatus comprises a rotor disposed about a central axis of rotation which houses a reservoir for holding the liquid to be formed into capsules, and conduits which lead to ports spaced uniformly on the circumference of a circle. When the rotor is actuated, spheroidal droplets of the capsule-forming material take shape at the ports and are propelled radially outwardly into a gelling agent contained in a reservoir which comprises an annular surface spaced radially apart from the ports.

8 Claims, 2 Drawing Figures

APPARATUS FOR PRODUCING CAPSULES

BACKGROUND OF THE INVENTION

This invention relates to a machine for rapidly producing microcapsules.

There are several microcapsulation processes wherein a gellable liquid containing a dissolved or suspended core material is formed into droplets, and the droplets are then immersed in a gelling agent to produce shape-retaining, generally spherical capsules which entrap the core material. One example of this general technique is disclosed in U.S. application Ser. No. 24,600, filed Mar. 28, 1979, now U.S. Pat. No. 4,352,883, the disclosure of which is incorporated herein by reference. This patent discloses that core materials, including labile biological materials such as microorganisms and living tissue such as mammalian cell cultures and the like may be encapsulated without damage by suspending or dissolving the core material in a solution of a substance which can be reversibly gelled, for example, sodium alginate, forming the solution into droplets, gelling the droplets by exposing them to a gelling agent, for example in the case of sodium alginate, a divalent metal solution such as a calcium chloride solution, and subsequently forming a membrane about the droplets.

This encapsulation technique has immense potential in the fields of microbiology, genetic engineering, immunization, and tissue implantation. However, large scale commercial exploitation of the method requires development of a device for producing on a large scale capsules of substantially uniform properties.

SUMMARY OF THE INVENTION

The instant invention provides such an apparatus. In its broadest aspect, the apparatus comprises a rotor, disposed about a central axis of rotation, which includes a connector to a source of rotary power and plural, radially disposed conduits. The conduits terminate at ports spaced uniformly on the circumference of a cylinder having a central axis substantially coincident with the axis of rotation. Integral with the rotor and radially spaced apart from the ports is a liquid gelling agent reservoir comprising an annular surface on which the gelling agent rests during rotation of the reservoir and rotor.

In preferred embodiments, the centrally disposed rotor also includes a reservoir for holding a supply of the gellable liquid and core material, one or more conduits communicating with the gelling agent reservoir for replenishing gelling agent during capsule production, and a duct communicating with the gelling agent reservoir at a point below the ports for collecting capsules produced by the apparatus by suction. The rotor also preferably includes plural tubes or more preferably bundles of tubes extending radially from the rotor and spaced substantially uniformly about its circumference. When bundles of tubes are employed, spacers are preferably used to keep the tube ports spaced apart so as to avoid agglomeration of produced capsules.

The gelling agent reservoir preferably also includes one or more overflow conduits having an inlet in the annular surface above the ports and an outlet external to the reservoir to bleed off excess gelling agent during capsule formation. The overflow conduits are preferably radially adjustable so that the thickness of the layer of liquid gelling agent in the reservoir during operation can be maintained at the optimal value.

It is an object of the invention to provide an apparatus for producing microcapsules of substantially uniform volume and spheroidal shape at high speed which may be operated in either a pseudo-continuous mode or batch mode. Another object is to provide an apparatus capable of producing microcapsules having a substantially uniform concentration of suspended material. Yet another object is to provide an apparatus capable of producing substantially uniform spheroidal microcapsules of a selected volume generally within the range of 100-1,000 microns in diameter.

These and other objects and features of the invention will be apparent from the following detailed description and from the drawing.

DESCRIPTION

Figure 1:
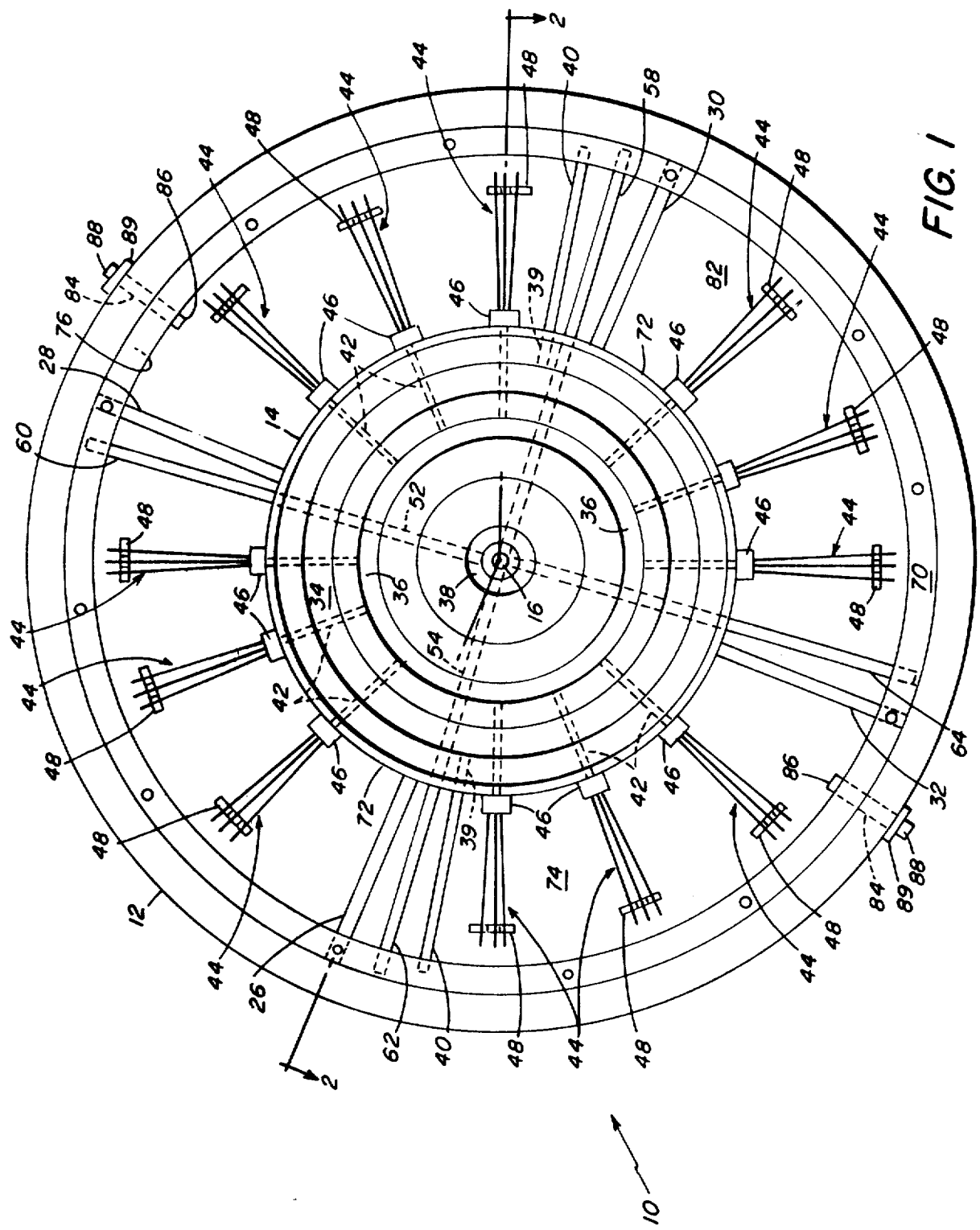
FIG. 1 is a top view of the apparatus of the invention.
Figure 2:
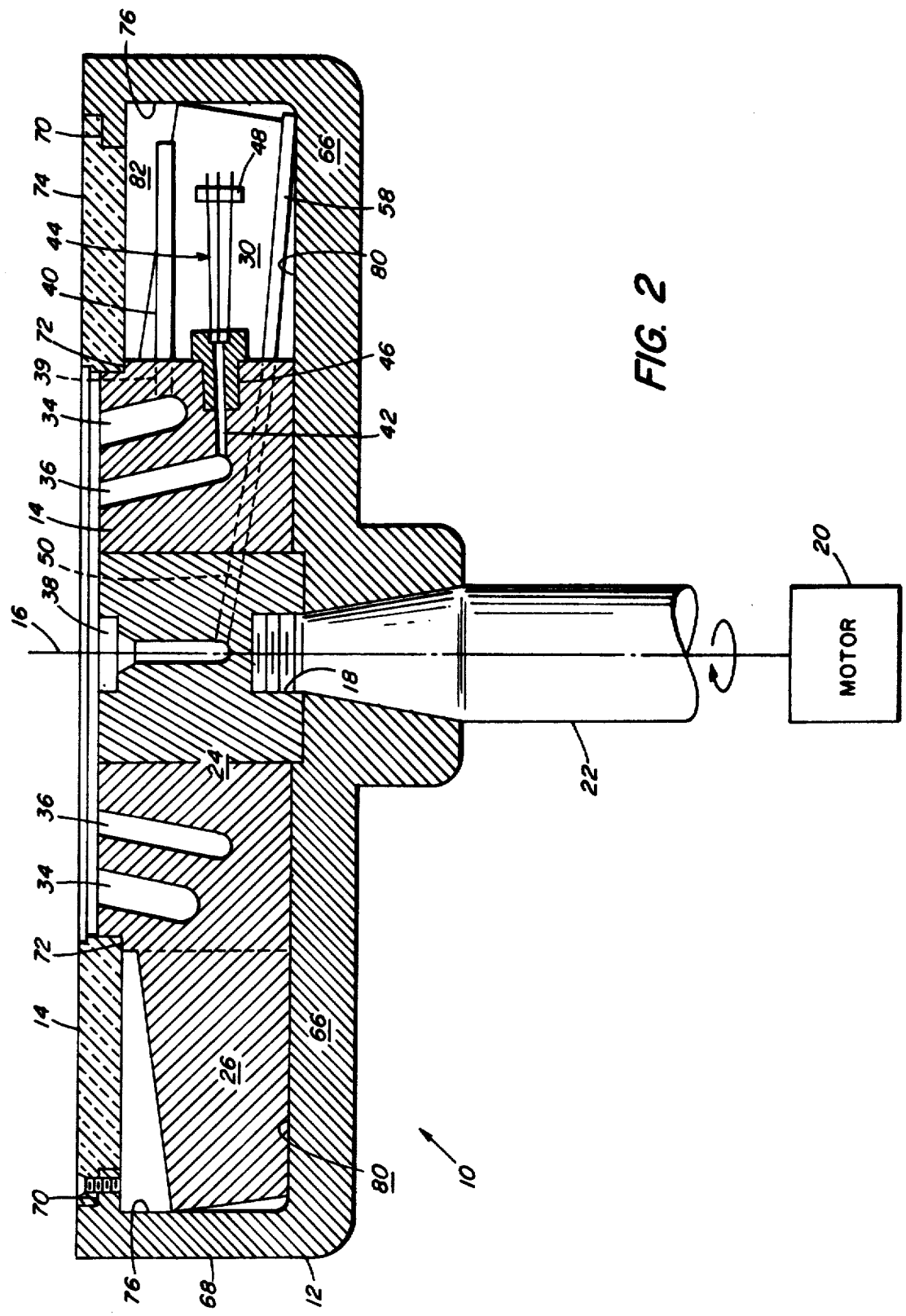
FIG. 2 is a cross-sectional view of the apparatus of FIG. 1 taken at lines 2—2.

Referring to the drawing, there is shown a rotor assembly 10 generally consisting of a housing 12 which defines a gelling agent reservoir 82 and a rotor 14 having a central axis of rotation 16. A female coupling 18 serves to connect the rotor assembly 10 to a source of rotary power through a drive shaft, schematically illustrated as motor 20 and drive shaft 22. When motor 20 is actuated, rotor assembly 10 rotates about axis 16.

The rotor 14 consists of a solid, generally disc-shaped central block 24, having four integral, radially directed vanes 26, 28, 30 and 32. Block 24 defines a pair of concentric circular reservoirs 34 and 36 and an opening 38 coaxial to axis 16.

A pair of conduits 39 spaced 180 degrees apart adjacent the bottom of reservoir 34 pass through the block 24 and communicate with tubes 40 which project radially from the side of rotor 14. Reservoirs 34 and their associated conduits 38 and tubes 40 serve to replenish gelling agent during production of microcapsules.

Adjacent the bottom of reservoir 36 is a plurality of regularly spaced, radially directed conduits 42, each of which communicate with a bundle of hollow needles designated generally as 44. Needle bundles 44 pass through needle holders 46, integral with the block 24. Each needle in each bundle projects generally radially from the needle holders 46 and its end is kept separate from other needles in the bundle by spacers 48. Preferably, the needles are made of stainless steel. They can have an interior coating to reduce surface tension of a polytetrafluoroethylene-type polymer such as that sold under the trademark TEFLON. While the illustration shows 12 needle bundles, each of which include 9 needles, the number of bundles and the number of needles per bundle may be altered as desired. For example, 12 bundles of 15 needles may be employed. Each needle terminates in a port 45. The length of the needles is selected such that the distance between the ports 45 and the inner surface of the gelling agent contained in the reservoir 82 in operation is large enough to avoid clumping of the produced capsules but small enough to avoid disintegration of droplets projected from the ports on impact with the gelling agent. Generally, the distance should be between about 2 to 5 millimeters when producing capsules of the type set forth below.

The length and inside diameter of the needles combined with the viscosity of the solution and the pressure head serve to control the flow rate through the needles, and hence the droplet formation rate.

Adjacent the bottom of central opening 38 spaced 90 degrees apart are four ducts 50, 52, 54 and 56 defined within block 24 which communicate respectively with microcapsule-collecting tubes 58, 60, 62 and 64. As illustrated, the tubes communicate with reservoir 82 at a point below ports 45 near the outer periphery.

The rotor assembly housing 12 consists of a disc-shaped bottom portion 66, vertically disposed sidewall 68 and lip 70 which support, together with lips 72 defined in block 24, a transparent cover plate 74. The interior surface 76 of sidewall 68, and interior surface 80 of plate 66 together define the gelling agent reservoir 82 which is separated into 4 compartments by vanes 26. The vanes 26 serve to stabilize the layer of gelling agent resting against annular surface 76 during operation of the apparatus and to prevent induction of rotary motion in the gelling agent that is out of sync with rotor assembly 10, particularly during changes in rotational speed.

Within reservoir 82 at a point above ports 45 are a pair of overflow conduits 84 spaced 180 degrees apart. The overflow conduits 84 each define an inlet 86 and an outlet 88. Hexagonal nuts 89, journalled within the side wall 68, serve to adjust the radial distance of inlets 86 from annular surface 76, thereby providing an adjustment of the thickness of the layer of gelling agent present in reservoir 82 during operation and maintaining the distance constant between the inner surface of the gelling agent and ports 45.

In operation, gelling agent is placed in reservoir 82 and a liquid containing dissolved or suspended core material is loaded into reservoir 36. When motor 20 is actuated, rotor assembly 10 rotates about axis 16. Liquid gelling agent in reservoir 82, urged by centrifugal force, forms a layer, preferably on the order of 15-25 millimeters thick and most preferably about 23 millimeters thick on annular surface 76. Greater thicknesses may be used to advantage. Simultaneously, the gellable liquid and core material contained in reservoir 36 is urged by centrifugal force through conduits 42 and the hollow needles of needle bundles 44. As the liquid passes out of the needles of bundle 44 through the ports 45, it breaks up into droplets which are propelled radially across the 2-5 millimeter gap to the layer of gelling agent where they are immersed and gelled to form shape-retaining microcapsules. As the volume of liquid in reservoir 82 increases, excess, partially depleted gelling agent passes through the inlets 86 of overflow conduits 84 and is expelled through outlets 88. The gelling agent is restored as required by adding fresh liquid to reservoir 34 where, by the action of centrifugal force, it is propelled through tube 40 into reservoir 82. Vanes 26, 28, 30 and 32 stabilize the volume of gelling agent. After completion of a batch of microcapsules, the capsules are recovered by drawing a suspension of the capsules in the gelling agent through tubes 58, 60, 62 and 64, ducts 50, 52, 54 and 56, and central openings 38. If, in operation, the rotor assembly is rotated below about 200 rpm, microcapsules may be withdrawn during operation by suction.

The diameter of the produced microcapsules is dependent on the viscosity of the gellable liquid and core material suspension or solution, the surface tension of the interior of conduits 42 and needles 44, the diameter of the ports 45, the rate of rotation of the rotor assembly 10, and the height of the liquid maintained in reservoir 36. The flow rate of the gellable solution and core material through the individual needles of needle bundles 44 is effected by all of the foregoing parameters and is a dominant factor in adjusting capsule size. Generally, the flow rate should be between about 0.1 and 1.0 milliliters per minute per needle with a 0.1 to 0.5 rate preferred. An approximately 2% or less, preferably 0.8-2.0% (W/V) aqueous solution of sodium alginate containing a suspension of cells ($10^6$-$10^7$ cells/ml of alginate solution) will form microcapsules having a diameter in the range of 100-120 microns at 2,000 rpm with 30 gauge TEFLON-coated needles. At 600 rpm employing 26 gauge needles, capsules on the order of 500 microns in diameter are produced. In all cases where the gellable solution contains a separate phase, the flow rate through the needles should be adjusted so as to be greater than the sedimentation rate of the non-aqueous phase so that capsule content remains substantially uniform. These sodium alginate microcapsules are readily gelled in the dilute (approximately 1-2% W/V) solution of calcium chloride contained in reservoir 82. Good results are obtained when employing the batch method if up to equal volumes (e.g. 800 ml) of a mixed alginate-cell suspension solution and $CaCl_2$ solution are used. The optimum gap appears to be about 4.0 millimeters in this system at 600 rpm and 2.0 millimeters at 2000 rpm.

As disclosed in U.S. application Ser. No. 24,600, these capsules may subsequently be treated with a dilute solution of a polycationic polymer such as polylysine to produce a membrane about the alginate capsules. Alternatively, the gelling solution may itself comprise a dilute solution of a polycation, in which case the liquid alginate droplets which traverse the distance between ports 45 and the surface of the polycation solution are provided with a polycationic membrane which maintains their spheroidal shape.

The invention may be embodied in other specific forms without departing from the spirit and scope thereof. Accordingly, other embodiments are within the following claims.

What is claimed is:

1. An apparatus for producing capsules by forming liquid droplets containing a core material and then immersing the droplets in a liquid gelling agent to produce shape-retaining capsules, said apparatus comprising:
    a rotor disposed about a central axis of rotation and defining means for connection with a source of rotary power and plural radially disposed conduits for carrying said liquid droplets and core material;
    means integral with said rotor defining ports spaced uniformly apart from said central axis, each said port being in communication with at least one of said radial conduits; and
    a member integral with said rotor defining a liquid gelling agent reservoir comprising an annular surface spaced radially apart from said ports on which said liquid gelling agent rests during rotation of said reservoir, whereby during rotation about said central axis the liquid and core material are forced through said radially disposed conduits, droplets are formed and propelled radially as said liquid material and core material pass from said ports, and the droplets are gelled upon immersion in the liquid gelling agent contained in said reservoir.

2. The apparatus of claim 1 wherein said rotor defines a reservoir for containing said liquid and core material.

3. The apparatus of claim 1 wherein said means defining ports comprise hollow needles extending radially from said rotor.

4. The apparatus of claim 3 comprising plural bundles of hollow needles 44, each of each said bundle being maintained in spaced apart relation from others by spacers adjacent said ports.

5. The apparatus of claim 1 wherein said rotor further defines conduit means communicating with said gelling agent reservoir for replenishing gelling agent during capsule production.

6. The apparatus of claim 1 wherein said rotor further defines a duct communicating with said reservoir at a point below said ports for collecting produced capsules.

7. The apparatus of claim 1 wherein said member defines overflow conduits having an inlet disposed within said gelling agent reservoir and an outlet external to said reservoir.

8. The apparatus of claim 7 including means for adjusting the distance between said overflow conduit inlet and said annular surface.

* * * * *